Patented July 21, 1942

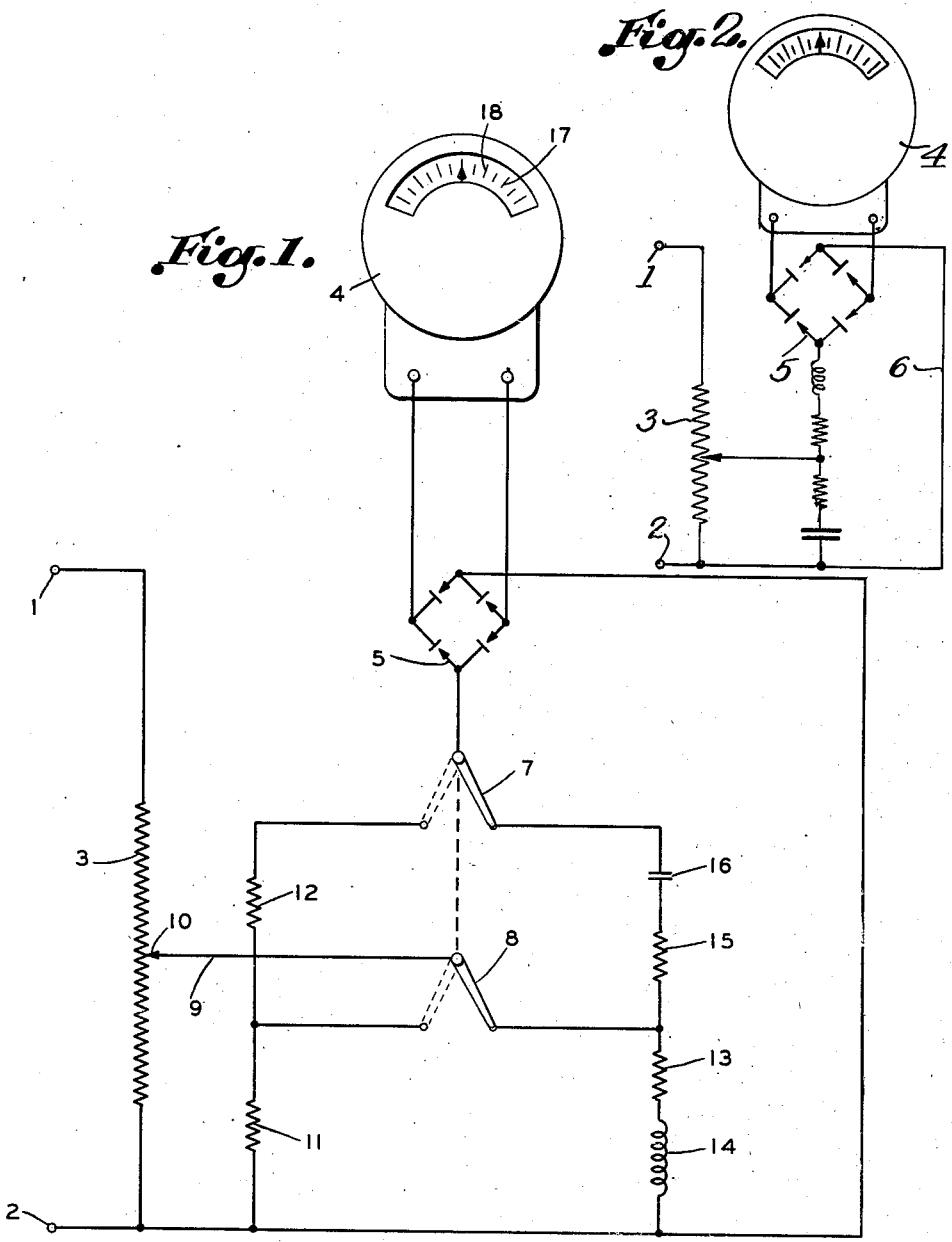

2,290,754

UNITED STATES PATENT OFFICE 2,290,754

FREQUENCY INDICATOR

William G. Fluharty, Rockville Centre, N. Y., assignor to The Western Union Telegraph Company, New York, N. Y., a corporation of New York Application March 6, 1940, Serial No. 322,506

8 Claims. (Cl. 175—368)

This invention relates to a method of and means for measuring and indicating the frequency of periodic currents.

The major object of the invention is to provide a method of measuring and indicating frequencies which is simple and at the same time accurate.

Another object of the invention is to provide means to give a direct indication of the frequencies of periodic currents which is inexpensive and easily manipulated.

Another object of the invention is to provide a device for measuring frequency which may be utilized with voltages covering a substantially wide range.

Another object of the invention is to provide a frequency indicating device which may be employed to measure the frequencies of substantially any potential irrespective of the wave form thereof, provided that the wave form is known in advance.

Another object of the invention is to provide means for obtaining a direct reading of the frequencies of periodic currents by utilizing standard equipment or at least apparatus in which only minor modifications need be made.

Another object of the invention is to provide a device of this nature which is compact, rugged and portable.

The frequency indicator provided by the instant invention may be employed to measure the frequencies of substantially any periodic current, the wave form of which is known. For example it may be attached to the terminals of transmission lines such as those employed for the transmission of power, voice frequency currents, carrier currents, telegraph signals and the like. Such a device may be connected directly to the contacts of a telegraph receiving relay or it may be connected to apparatus employed for recording weak cable signals. It will be seen that a relatively high degree of accuracy may be obtained by the use of the indicator comprising the instant invention irrespective of the wave form of the current, the frequency of which is being measured, provided that the wave form of the current is known in advance. Because of this fact such a device may be used advantageously in place of most of the prior art devices. The limitations of the sympathetic vibrating reed type of frequency meter are well known. Also where heretofore a dynamometer type of meter was used, the wave shape had to be substantially sinusoidal in order to obtain indications which were to any degree accurate.

The method employed in the instant invention is that of adjusting the current supplied to a conventional voltmeter or milliammeter by impressing a predetermined potential upon a calibrating network comprised entirely of ohmic resistance elements whereby a certain deflection is obtained. After such calibration the meter is then connected into one branch of a reading network comprising two branches, one of which includes a resistance and a capacitative element and the other of which includes a resistance and an inductive element and the predetermined potential is impressed upon this network. The two branches of this reactive network are so constituted and adjusted in value that the combined impedance of the network remains substantially constant over a wide range of frequencies. Of course, at the same time, the impedances of the individual reactive elements comprising the network vary with the frequency of the impressed potential. Hence by first calibrating the indicating instrument by impressing a potential of predetermined value upon a calibrating network whereby a given deflection is obtained on the instrument, and by impressing substantially this same potential upon the reading network, the impedance of the meter circuit is cancelled out. Since the values of the elements comprising the reading network are chosen to prevent resonance of the network over a wide range of frequencies, the over-all impedance of the network remains substantially constant throughout this range of frequencies. In other words, this impedance has an effect in the circuit of a purely ohmic resistance. The value of this resistance is arranged to be equal to the value of the ohmic resistance of the calibrating network. In making the calculations for the two networks the resistance of the indicating meter is taken into account since in operation it is connected alternately in the two networks. Hence, being common to both networks, the resistance of the meter is effectively balanced or cancelled out for the reason that it obviously has the same effect upon both networks. The amount of current which is conducted through the meter branch is then dependent only upon the frequency as will be more clearly demonstrated hereinafter. In a preferred form the meter is connected in series with the capacitative branch of the reactive network. In this manner a direct frequency reading may be obtained from the scale of the instrument since the current in this branch of the network increases as the frequency increases. However, at very low frequencies, the impedance of the capacitative branch becomes very great so that only a small deflection of the meter needle or pointer is obtained. If it is desired to increase the amplitude of the deflection, one expedient is that of impressing a higher predetermined potential upon the network. This higher potential may be selected, when calibrating, so that a larger deflection, for example twice that previously referred to, is obtained. Alternative means for obtaining a substantial deflection at low frequencies comprises the connection of the meter in the inductive branch of the network. In this case, the scale of the meter will read from right to left instead of in the conventional left to right manner and an appreciable deflection of the needle or pointer may be obtained.

The following description is taken in conjunction with the accompanying drawing, of which Fig. 1 illustrates a preferred embodiment of the invention and Fig. 2 depicts an alternative embodiment of the invention.

Having reference now to Fig. 1 of the drawing, the source of potential, the frequency of which it is desired to measure, is indicated by reference characters 1 and 2. Connected between the terminals 1 and 2 is the resistance element of a potentiometer 3. Any conventional form of current sensitive device such as a voltmeter or milliammeter 4 is used as the indicating means. The instrument shown derives its current from the output or direct current terminals of a full wave rectifier 5. (Obviously, if an alternating current type of meter is used, the rectifier may be omitted.) One of the input terminals of this rectifier is connected by means of conductor 6 to one terminal 2 of the source of potential being measured. The other input terminal of the rectifier 5 is connected to the lever of a two position switch 7. The lever of another two position switch 8, which is moved simultaneously with the switch 7, is connected by means of a sliding contact 9 to a point such as 10 on the resistance element 3 of the potentiometer.

With the switches 7 and 8 positioned to the left as shown by the dotted lines, connection is made to a calibrating network. This network comprises a pair of resistance elements, one of which 11 is connected directly across the potential impressed between the points 10 and 2. The second resistance element 12 of the network is connected in series with the meter 4, this series circuit being arranged in shunt relation to the resistance 11. It should be noted that, by properly selecting the value of resistance 12, the shunt resistance element 11 may be omitted without detracting from the utility of the invention. The only requirement is that the effective value of the calibrating network be equal in ohms to the effective value of the reading network, the composition of which will be fully described hereinafter. The preferred type of meter used in the present system has a comparatively low resistance in order that it may be used to measure current when connected in the reading network. Consequently in order to adapt it for use in measuring voltage when connected in the calibrating network, it is necessary to include a relatively high resistance in series with the meter. In order to utilize a calibrating network comprising the series connection of a resistance and a meter, it is necessary to select values of the elements comprising the reading network so that the effective impedance of this network is equal to the resistance of the series connection of the high resistance and the meter. Such an arrangement is within the realm of practicability but it has been found that it is more convenient to construct a reading network which has a much smaller effective impedance. In order to adapt the series connection of the meter and the necessary high resistance to use with such a reading network, it is only necessary to shunt the series connection of the meter and the high resistance with a second resistance, the value of which is chosen to make the effective resistance of the calibrating network equal in ohms to the effective resistance of the more convenient reading network.

With the switches 7 and 8 in the right hand positions as shown by the full lines in the drawing, the potential of point 10 is impressed upon one branch of a network which comprises a resistance 13 and inductive element 14. This same potential is also impressed upon a second branch of the network, arranged in shunt relation to the above mentioned inductive branch, which comprises a resistance 15, a capacitative element 16, the rectifier 5 and the meter 4.

The inductance 14, the capacity 16, the resistances 13 and 15 are so proportioned that there is no tendency for an energy interchange between the two branches of the network. In other words they are arranged so that the combined network appears as an ohmic resistance at substantially all frequencies. The effect of this arrangement is that the impedance of the network remains substantially constant through a wide range of frequencies. The values chosen for the inductance, the capacity, and the resistance are such that for the range of frequencies employed the total resistance is substantially equal to the square root of the quotient obtained by dividing the inductance in henrys by the capacity in farads. It is well known that when this relation obtains, there is substantially no tendency for the circuit to oscillate. It follows that since the effective impedance of such a network is substantially constant throughout the range of frequencies employed, the total current derived from the source under test is substantially constant. The division of this current between the two branches of the network depends upon the frequency. As the frequency increases, the current through the inductive branch decreases, while the current through the capacity branch increases, and vice versa.

The operation of the device is effected in two steps, the first of which comprises placing the switches 7 and 8 in their left hand positions. The movable contact 9 of the potentiometer is then adjusted so that sufficient current is conducted through the meter 4 to give a predetermined deflection of the needle. If the wave shape of the potential to be measured is square topped, or substantially so, the potentiometer is adjusted so that the needle stands on the graduation 17. However where the wave shape is sinusoidal the adjustment is made so that the pointer is deflected to the graduation 18. The points 17 and 18 are determined from a previous calibration employing a known potential having known wave form and frequency. Having made this adjustment, the switches 7 and 8 are placed on their right hand contacts and the frequency may be read directly from the scale. Since the constants of the reading network have been chosen to obviate oscillatory conditions therein, the value of the current which is then conducted through the capacitative branch of this network is dependent solely upon the frequency of the source of potential 1—2; and since the voltage impressed upon the network, under conditions of use, is the same as that employed to effect a given deflection of the meter 4 when originally calibrated, the scale may be graduated in frequencies so that when the meter is connected with the reading network, a direct visual indication of the frequency under test may be obtained.

Fig. 2 shows the meter 4 connected in series with the inductive branch of the reading network. The purpose of such a connection is to make it easier to read relatively low frequencies. As the frequency of the potential applied to the terminals 1 and 2 decreases, the current through the capacity branch decreases and the current through the inductive branch increases so that it is possible to obtain a deflection of appreciable magnitude in response to low frequency potentials by connecting the meter in the inductive branch of the reading network. Obviously in this case the scale of the meter will read from right to left instead of in the conventional manner of from left to right as in the case of the connection shown in Fig. 1.

The essence of the invention may be ascertained from the foregoing description of two illustrative embodiments thereof. The scope of the invention may be determined from the appended claims.

What is claimed is:

1. A frequency indicator comprising a current sensitive device, a calibration network comprising two branches arranged in multiple connection and characterized by non-reactive resistances, a reading network having an impedance independent of frequency comprising a branch including a capacity element and a branch arranged in multiple connection therewith and including an inductive element, means for impressing a predetermined potential upon said networks, and means for switching said device from one of the branches of the calibration circuit into one of the branches of the reading circuit.

2. A frequency indicator comprising a current sensitive device, means for impressing a known potential upon said device, a network comprising a branch having an impedance which increases with an increase of the frequency to be measured and a second branch arranged in multiple connection therewith and having an impedance which decreases with an increase in the frequency to be measured, the impedance of the combined network arranged to remain constant irrespective of the frequency, means for connecting said device into one of said branches, and means for impressing said known potential upon said network.

3. A frequency indicator comprising a current sensitive device, a utilization circuit comprising two networks, each having a constant impedance irrespective of the frequency, one of said networks comprising two resistance elements arranged in branches connected in multiple, the other of said networks comprising a capacitative branch and an inductive branch arranged in multiple connection, means for obtaining a known potential, means for switching said device alternately between said networks, and means for alternately switching said potential between said networks.

4. A frequency indicator comprising a current sensitive device, a calibration network comprising two resistance elements arranged in multiple connection, means for including said device in series with one of said resistance elements, means for impressing a predetermined potential of unknown frequency on said network whereby a predetermined deflection of said device is obtained, a reading network having an impedance of frequency comprising a parallel connection of a capacity element and an inductive element, means for switching said device from said resistance branch to said capacity branch, and means for switching said potential to said reading network.

5. A frequency indicator comprising a current sensitive device, a calibration network characterized by non-reactive resistance, a reading network having an impedance of frequency comprising a branch including a capacity element and a second branch arranged in multiple connection therewith and including an inductive element, means for impressing a predetermined potential on said circuits, and means for switching said device from the calibration circuit into one of the branches of the reading circuit.

6. A frequency indicator comprising a current sensitive device, means for impressing a known potential on said device, a network comprising a branch having a series connection of an inductance and a resistance and a second branch arranged in multiple connection with said first named branch and comprising a series connection of a capacity and a resistance, the impedance of the combined network being arranged to remain constant irrespective of the frequency, means for connecting said device into one of said branches, and means for impressing said known potential upon said network.

7. The method of determining and indicating the frequency of a given potential which comprises the steps of utilizing a portion of said potential to produce a predetermined deflection of a current sensitive device and switching said device into one branch of a parallel circuit, said parallel circuit having an impedance arranged to remain constant irrespective of the frequency, and said one branch having an impedance arranged to vary with the frequency.

8. A frequency indicator comprising a current sensitive device, a calibration network comprising two resistance elements arranged in multiple connection, means for including said device in series with one of said resistance elements, means for impressing a predetermined potential of unknown frequency on said network whereby a predetermined deflection of said device is obtained, a reading network having an impedance independent of frequency comprising a parallel connection of a capacity element and an inductive element, means for switching said device from said resistance branch to said inductive branch, and means for switching said potential to said reading network.

WILLIAM G. FLUHARTY.